Figure 1:
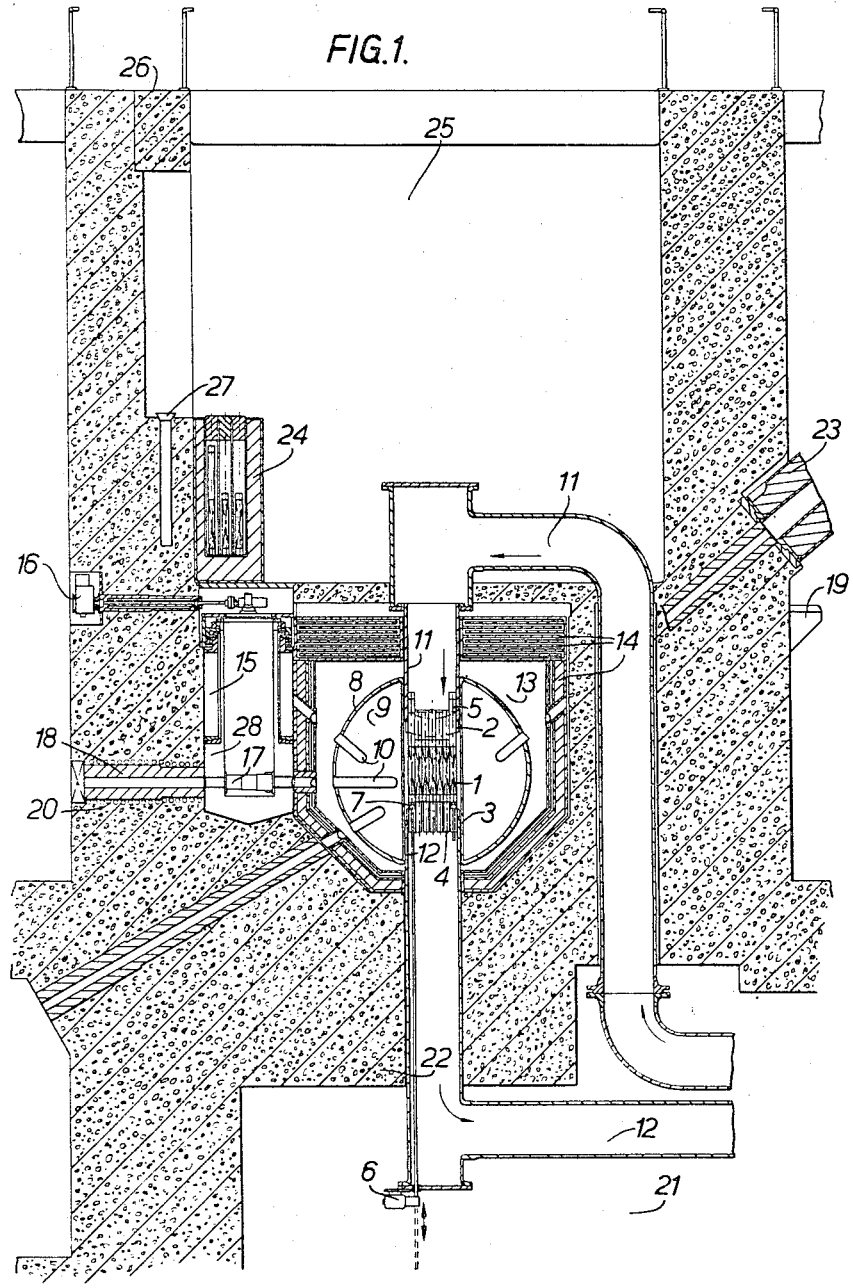

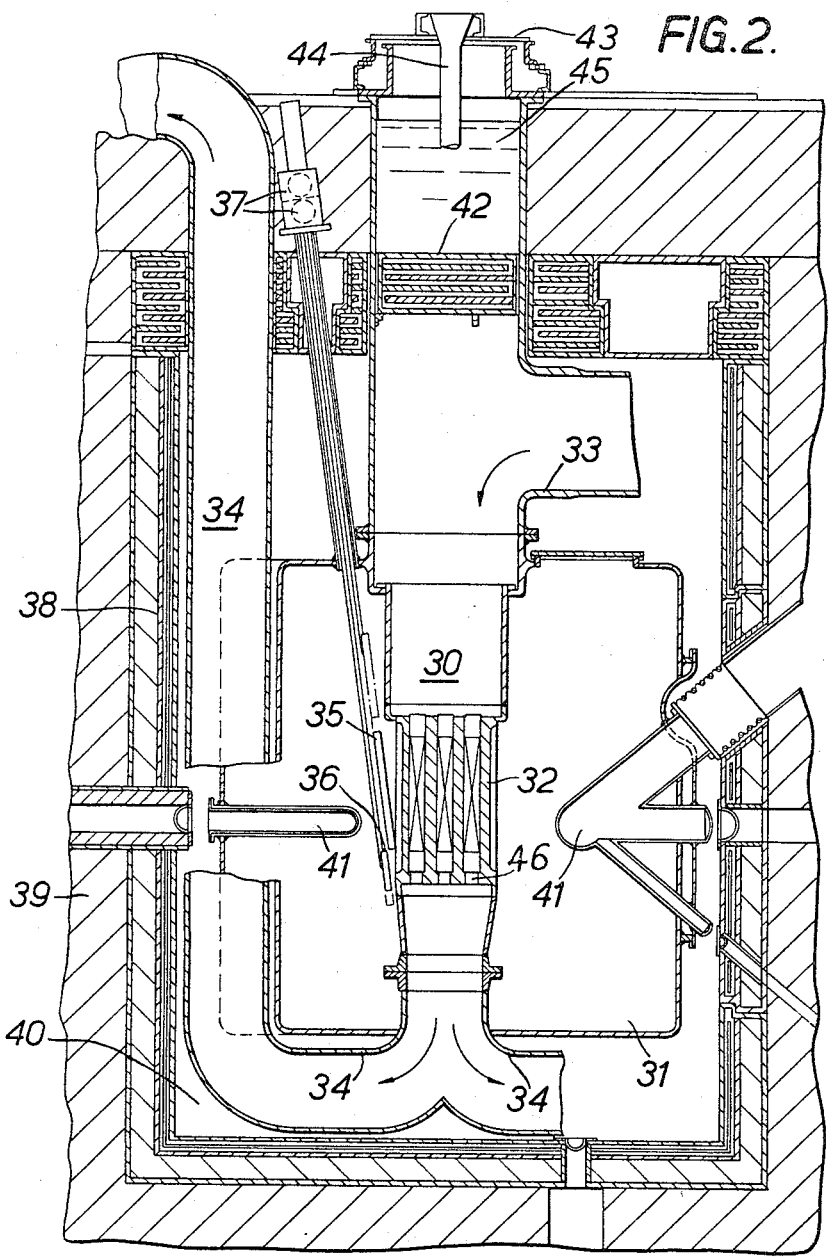

3,379,615
NUCLEAR REACTORS
Dixon Brydson Halliday, Abingdon, England, assignor to United Kingdom Atomic Energy Authority, London, England
Filed Aug. 25, 1965, Ser. No. 482,387
Claims priority, application Great Britain, Aug. 28, 1964, 35,448/64
1 Claim. (Cl. 176—44)

This invention relates to nuclear reactors and is particularly concerned with reactors in which water is used as moderator, coolant and reflector.

Such a reactor is useful as a neutron beam producing reactor particularly when operated using an undermoderated core and highly enriched fuel. In such a reactor, tubes, through which neutrons may stream, are provided through the biological shield into the reactor. Such tubes, hereinafter referred to as beam tubes, may be used for irradiation purposes or to allow a neutron beam to pass to extrenal experimental apparatus.

Various problems can arise in the construction and operation of a high flux beam reactor, for example with a high flux water cooled research reactor it is desirable to pressurise the water coolant circuit, perhaps to 500 p.s.i., to permit the highest power densities in the core, which are needed both to obtain high thermal fluxes in the reflector and high fast fluxes in the core. If the whole reactor containment is pressurised, then the design of the experimental facilities is very difficult due to stress problems, particularly where multiple facilities are required. On the other hand, if a pressure vessel is placed between the core and the reflector, the thermal flux in the reflector is depressed considerably and the design of the pressure vessel is again difficult due to the high thermal stresses arising from radiation heating.

The object of the present invention is to provide a nuclear reactor particularly suitable for operation as a high flux neutron beam producing unit.

According to the present invention a nuclear reactor comprises a vessel ring shaped in horizontal cross-section to contain a liquid reflector, a plurality of elongated tubular fuel elements centrally located within the central void of said vessel to form a core, means for passing a coolant fluid through said core to act as coolant and moderator, said fuel elements comprising high enriched uranium alloy fuel and being spaced so as to provide a severely under-moderated core.

Preferably the liquid reflector is non-pressurised heavy water and the coolant may be pressurised light or heavy water.

In one aspect of the invention coolant inlet and outlet ducts extend partly into the central void of said vessel and the fuel elements are located within pressure tubes which extend vertically between inlet and outlet header plates secured to the ends of said ducts.

In a preferred arrangement the fuel elements are vertically supported within an aluminium alloy block interposed between the ends of said inlet and outlet ducts in in the central void of the vessel.

To enable the nature of the invention to be more readily understood one embodiment of the invention will now be described by way of example with reference to the accompanying drawings. In the drawings:

FIG. 1 is a somewhat diagrammatic vertical mid-sectional view of a high flux neutron beam reactor and FIG. 2 is a vertical mid-sectional view of an alternative construction for the same reactor.

Referring to FIG. 1 of the drawings a nuclear reactor arranged to provide experimental facilities in the form of neutron beams comprises a core 1 formed by thirty-seven elongate tubular fuel elements.

The core is located in the central void of a generally torroidal shaped vessel 8 containing a liquid reflector 9, for example, heavy water. The vessel is vented to maintain the reflector at atmospheric pressure. Inlet and outlet coolant ducts 11 and 12 extend partly into said central void and terminate in apertured inlet and outlet header plates 3 and 5. The fuel elements are located axially within pressure tubes 4 which extend between inlet and outlet header plates 3 and 5.

The pressure tubes 4 are each provided with a portion having a reduced internal diameter such that the lower end of the fuel element is supported by the pressure tube.

The reactor control mechanism comprises a composite assembly having a fuel element at its lower end and a neutron absorber at its upper end separated by a relatively non absorbing non-fissile section. The control absorber/fuel elements are installed around the periphery of the core assembly in place of conventional fuel elements and are each movable vertically to move the absorber section or fuel section into or out of the core by a motor 6.

The inlet and outlet cooling ducts pass through gamma and thermal neutron shields 14 arranged around the vessel 8. The shields 14 enclose a gas filled space 13 formed within the biological shield 22.

Various experimental facilities are located around the reactor for example a number of beam tubes 10 pass through the biological shield, through the gamma and thermal neutron shield 14 across the gas space 13 and into the reflector vessel.

It will be appreciated that by separating the reflector from the high pressure coolant that the problems caused at the various points of tube penetration due to thermal expansions and high pressures are minimised since the reflector liquid is unpressurised and cool relative to the reactor coolant. The reflector liquid is preferably circulated through coolers (not shown) to maintain a low temperature.

To enable an experimenter to modify his equipment easily and safely each high flux beam hole is provided with a shutter. The shutter is located in a vertical cylindrical hole formed in the biological shield 22 adjacent the reactor thermal shield 14. The shutter comprises two independent cylindrical parts 15 and 28 concentrically arranged for rotation by a drive motor 16 through gearing. The parts 15 and 28 may be rotated together or independently. The inner part 28 extends below the outer part 15 and comprises a hollow vessel formed from concentric steel tubes. The inner tube is rectangular in cross-section and the space between the tubes is filled with water containing a thermal neutron absorber. The lower portion of part 28 is increased in diameter and pierced by tubes slightly larger in diameter than the beam tube. The inner tube is provided with a removable core of shielding material and arranged to contain bismuth and beryllium neutron filters 17 at liquid nitrogen temperatures. Provision for supply lines to the filters are accommodated in the removable core.

The upper end of part 15 is rotatably supported on a ball race and engageable through a gear wheel to the drive means.

The outer part 15 comprises a vessel formed from two concentric tubes and, the annular space being also filled with water containing thermal neutron absorber. A tube passes through the annular space and is registerable with the azimuthal beam tube. The outer part 15 is rotatable supported at its upper end on a ball-race and is engageable through a gear wheel to the drive means.

In operation both parts of the shutter may be rotated together through 90° to close off both beam holes or if desired either part of the shutter may be operated without causing inconvenience to an experiment being carried out in the related beam tube. A load/unload flask 23 associated with the beam tubes permits experiments to be loaded and unloaded as desired.

A water filled canal 25 located above the upper thermal shield acts as an additional shield and permits fuel changing to be carried out visually. This arrangement is particularly advantageous when using light water as coolant. A fuel storage and delay vessel 24 is provided in canal 25 and permits irradiated fuel elements to be held before disposal via the spent fuel chute 27 to a storage pond and processing operations. A reactor operations floor 26 extends around the canal and a gallery 19 provides a working access to the azimuthal beam tubes.

In an alternative construction shown in FIG. 2 the reactor comprises a core of 37 elongate tubular fuel elements located in a close pitched hexagonal array within the central void 30 of a reflector tank 31. The reflector tank of relatively thin aluminium plate is substantially annular in horizontal cross-section. The fuel elements are housed in an aluminium alloy core block 32 interposed between the ends of coolant inlet duct and outlet duct 33 and 34. The said ducts extend into and form part of the walls of the central void. The block 32 is bored to accommodate the fuel elements and the mass of aluminium alloy is further reduced by drilling holes between the fuel-element holes and machining away the external surface of the block to follow the contours of the outer fuel elements. The fuel element holes are each provided with a reduced diameter portion 46 such that the lower end of a fuel element is supported in each hole.

Reactivity control absorbers 35 slide in guides attached to the "flat" sides of the hexagonal core block and the guides are slightly angled outwards so that they clear the outward-protruding transition portion between the hexagonal and cylindrical sections. The lower control absorbers 36 are accommodated by tapering the core block 32 inwards beneath the core. The absorbers are driven via gear boxes 37.

The core coolant circuit directs heavy water coolant downwards through the central void in the reflector tank via inlet duct 33 and then upwards via ducts 34 to external heat exchangers (not shown). The ducts 34 are located partly in recesses formed in the outer wall of the reflector tank 33 and are thus enclosed within the reactor gamma and thermal neutron shield 38 and outer concrete shield 39. The interior spaces 40 within shield 35 are filled with $CO_2$.

The beam tubes 41 extend into the reflector tank passing through the shields 38 and 39 in the conventional manner.

To enable the core assembly to be easily replaced a removable thermal shield 42 is located in a tubular extension 45 which extends above the coolant inlet duct 33 and central void 30. The extension is closed at its upper end by a removable cover plate 43 which carries a fuel element charge tube 44. The extension is arranged to remain full of reactor coolant during reactor operation.

I claim:
1. A liquid cooled, moderated and reflected nuclear reactor comprising:
   (a) a plurality of elongate fuel elements arranged in a spaced side by side relationship forming an under-moderated core,
   (b) each element being individually located within a coolant channel formed through a core block,
   (c) said core block being formed of an aluminum alloy and interposed between a coolant inlet duct and a coolant outlet duct,
   (d) said ducts and said core block defining the central void of a reflector containing vessel, said vessel being substantially annular in horizontal cross-section, and
   (e) each channel being provided with a reduced diameter portion engagable with the lower end of a fuel element.

References Cited
UNITED STATES PATENTS

| | | | |
|---|---|---|---|
| 2,832,733 | 4/1958 | Szilard | 176—52 |
| 2,982,710 | 5/1961 | Leyse et al. | 176—62 |
| 3,149,043 | 9/1964 | Goldstein et al. | 176—62 |
| 3,227,619 | 1/1966 | Plante | 176—22 |
| 3,238,107 | 3/1966 | Leyse et al. | 176—62 |
| 3,251,746 | 5/1966 | Jeffries et al. | 176—22 |
| 3,190,807 | 6/1965 | Bevilacqua | 176—61 |

FOREIGN PATENTS

| | | |
|---|---|---|
| 640,221 | 3/1964 | Belgium. |
| 838,528 | 6/1960 | Great Britain. |

CARL D. QUARFORTH, *Primary Examiner.*

L. DEWAYNE RUTLEDGE, *Examiner.*

H. E. BEHREND, *Assistant Examiner.*